United States Patent Office 3,004,473
Patented Oct. 17, 1961

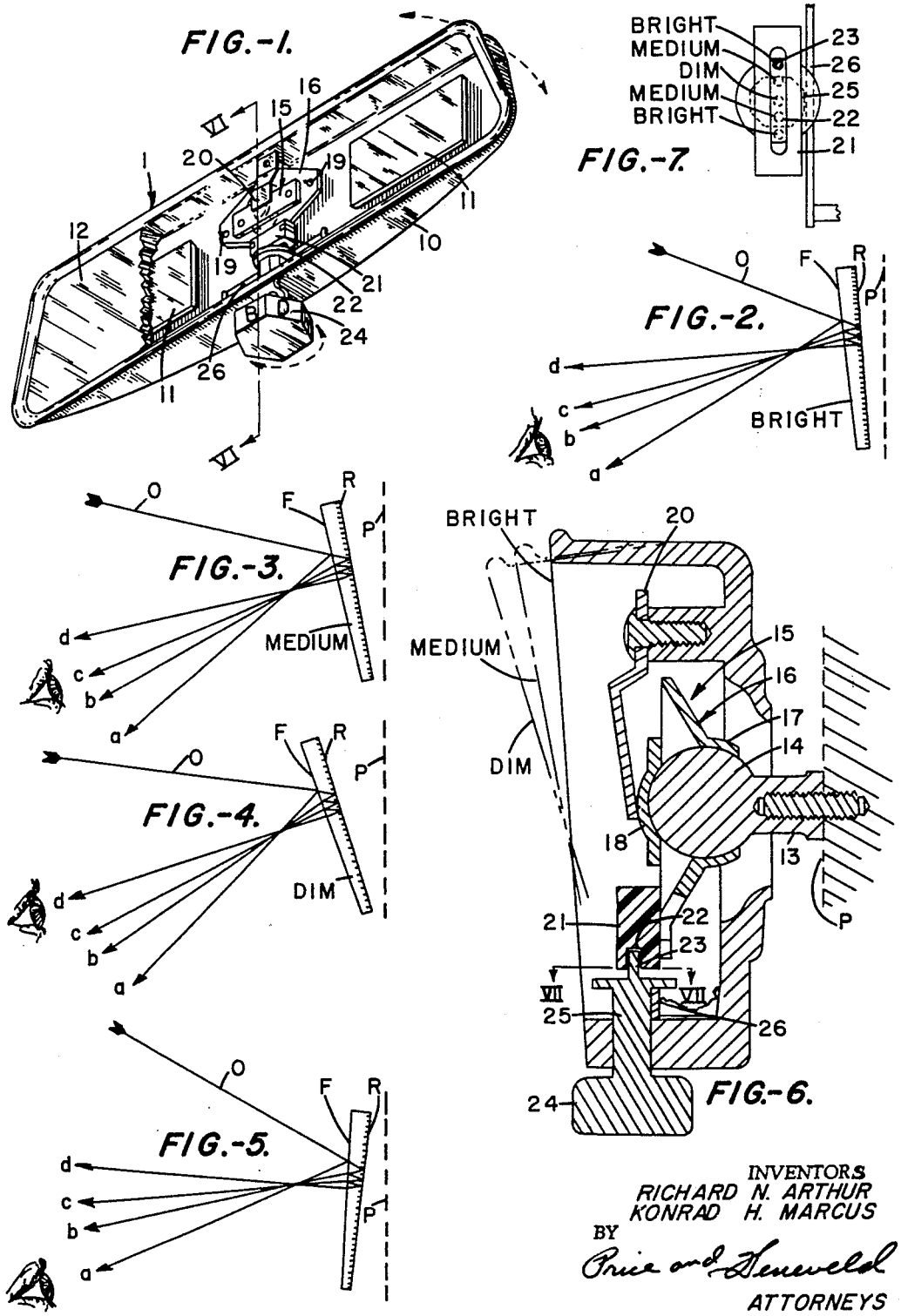

3,004,473
REAR VIEW MIRROR FOR MOTOR VEHICLES
Richard N. Arthur and Konrad H. Marcus, Holland, Mich., assignors to Donnelly Mirrors, Inc., a corporation of Michigan
Filed May 15, 1958, Ser. No. 735,546
1 Claim. (Cl. 88—77)

This invention relates to a rear view mirror for motor vehicles and particularly to such a mirror having three or more selective images of the rear road conditions such images being variable in intensity.

Three-way rear view mirrors are not new. Probably the most popular of these type mirrors, prior to this invention, is a mirror having a partially transparent front mirror surface of from 30% to 70% reflectivity which provides the brightest image and a rear surface of lower reflectivity which produces in combination with the front surface the other progressively less intense images. Such type mirror is shown in U.S. Patent No. 2,631,498 to D. W. Barkley.

Three-way mirrors of this type of construction have inherent disadvantages which include difficulty in distinguishing the intensities of the less intense images. This is primarily due to the fact that the human eye distinguishes units of intensity logarithmically. Therefore, in order to have a substantial difference in the intensities of reflectivity of two images which will make them easily distinguishable, one intensity must be several times greater than the other. Basically then, an inherent disadvantage of three-way mirrors of this type of construction is the inability to produce sufficiently sharp reduction of reflectivity between the images at the lower ranges.

Another inherent disadvantage of previous mirrors of this type is the discoloration of the images produced by the required surface coatings. Probably the outstanding disadvantage, however, is the cost in coating both of the surfaces to produce the required reflectivities.

An object of this invention is to provide a three-way mirror having a sharp reduction in the reflectivity of the images reaching the driver's eyes when adjusting the mirror from the second position of medium intensity to the third position of low intensity.

Another object of this invention is to provide a mirror producing desired images of proper intensity with no discoloration from wave interference.

Still another object of this invention is to provide a rear view mirror having three positions to produce three distinct images of different reflective intensity, the cost of such mirror being substantially the same as conventional one or two-way mirrors.

Other objects of our invention will become obvious upon reading the following specification in conjunction with the accompanying drawings, wherein:

FIG. 1 is a perspective view of a mirror unit having the mirror partially cut away to show the adjustment mechanism for the unit.

FIG. 2 is a diagrammatic view of the mirror located in a position in which the observer or driver sees a bright image.

FIG. 3 is a diagrammatic view of the mirror in a second position in which the observer or driver sees a medium bright image.

FIG. 4 is a diagrammatic view of the mirror in a third position, in which position the observer sees a dim image.

FIG. 5 is a diagrammatic view of the mirror positioned where the observer or driver sees an image of medium intensity similar to that of FIG. 3, the image, however, being on the opposite side of the bright image from the dim image.

FIG. 6 is a cross-sectional view taken along the plane VI—VI of FIG. 1.

FIG. 7 is a cross-sectional view taken along the plane VII—VII of FIG. 6

Briefly, this invention relates to a rear view mirror unit for a motor vehicle. This mirror unit includes a rigid support means for mounting the unit in a motor vehicle. A mirror frame is supported on an adjustable support means which in turn is adjustably supported on the rigid support means in successive first, second, and third positions. Actuating means is provided for successively moving the mirror to each of the selective positions. A mirror is mounted on the frame. This mirror has a front surface of 3–10% reflectivity and a rear surface of 60–100% reflectivity. The surfaces are arranged to bring into view of the driver a bright primary reflection of the rear surface in said first position of the frame, a medium intense secondary reflection of the rear surface in said second position of the frame, and a dim tertiary reflection from the rear mirror in the third position of the frame. In one aspect of this invention a medium primary reflection from the front surface is brought into the view of the driver in the first position of the frame, a bright primary reflection is produced in the second position of the frame, and a dim tertiary reflection is produced from the rear mirror surface in the third position of the frame.

Referring to the drawings, reference numeral 1 designates a mirror unit including a frame 10 supporting two mirror support elements 11 to which the mirror 12 is bonded. The entire unit is rigidly mounted to the body of the vehicle by the shank 13 of a ball and socket assembly. A ball 14 is located on one end of the shank and supported in the socket support assembly 15. Assembly 15 includes a stamped element 16 having a concave ball receiving portion 17 in which the ball 14 is seated and held by a plate 18. The ball is journaled in the socket thus permitting the entire unit to be adjusted like any other conventional universal joint normally provided for rear view mirrors.

The frame 10 is adapted to be adjusted relative to the socket support assembly 15 for bringing into view various images of different reflective intensity. This can be accomplished in many different ways; however, in order to illustrate this invention FIGS. 1 and 6 disclose one conventional way.

This particular adjustment mechanism includes pivotally mounting the frame 10 on the stamped element 16 by the pins 19 extending into enlarged openings at the ends of the stamped elements 16. The frame is retained on the socket support pins by the finger 20 and is rockable about an axis extending from one pin to the other. Attached to the stamped element 16 of the socket support assembly 15 is a stationary cam element 21 having a slot 22 in which an eccentric crank element 23 extends and slides. This crank element is rotated by an exterior adjustment knob 24. The eccentric arrangement of crank element 23 with relation to the axis of rotation of the adjustment knob 24 causes the frame to be rocked when knob 24 is turned changing the position of the frame in relation to the socket support assembly 15. This provides for the adjustment of the mirror which brings into the view different images previously referred to.

In order to establish definite positions, the shank located between the adjustment knob and the crank element 23 has eight cam surfaces 25 (FIG. 7). A spring 26 engages these cam surfaces one at a time to prevent accidental turning of the crank. These eight cam surfaces establish three definite tilted positions of the mirror (Bright, Medium, and Dim) with relation to plane *p*.

Having described one way in obtaining the three positions for the mirror, it should be understood that this invention does not relate to such adjustment mechanism. The mechanism described above is purely for the reason for illustrating one way of obtaining such an adjustment.

The mirror of the unit has a front surface F and a rear surface R. The front surface has a reflectivity of 3–10%. It can be coated with any material that will produce such a reflectivity. We have found that coating the front surface with silicone gives a very low reflectivity but at the same time helps to prevent the front surface from collecting dirt. Another material we have found satisfactory for producing the desired reflectivity is titanium dioxide which gives a 7% reflectivity. We have also found that no coating is required on the front surface to produce satisfactory results.

The rear surface R is coated with silver or any other material producing a reflectivity of 60–100%. Of course 100% reflectivity is impossible to obtain. Therefore, it should be understood that when we refer to 100% we means near 100%.

The front and rear surfaces are arranged slightly oblique to each other. The particular angle is chosen so that the reflected images cross each other at points located between the mirror and the driver. This produces images diverging from each other so that the images are sufficiently separated and isolated one from the other permitting the driver to see only one image at a time. This separation is accomplished by small changes in the tilted angle of the mirror unit.

The preferred images brought into view of the driver are illustrated by FIGS. 2, 3 and 4. These figures shows the images $a$, $b$, $c$ and $d$. The image $a$ is a direct or primary reflection from the front surface F. The image $b$ is a direct or primary reflection from the rear surface R. The image $c$ is a so-called secondary reflection from the rear surface R. This image is produced by a reflection from the rear surface, front surface, and a second reflection from the rear surface. The fourth image is what we refer to as a tertiary reflection from the rear suface R. This reflection results from sequential reflections from the rear surface, front surface, rear surface, front surface and finally the rear surface producing the image $d$.

In the first position of the mirror as illustrated by FIG. 2 the image $b$, which is the brightest image, is brought into view of the driver. The other images are not seen by the driver. The second position illustrated by FIG. 3 shows the image $c$ brought into view of the driver. In the next position, that is, the third position of FIG. 4, image $d$ is brought into view of the driver. It is obvious from these figures that the successive first, second and third positions bring successively into view of the driver the bright, medium, and dim image of the object O. The following illustrates the intensities of the images at the various positions. The examples of this invention used in this test had rear surfaces of approximately 90% reflectivity (R) and front surfaces of 4.2% reflectivity (R) and 7% reflectivity (R).

| Position | Front Surface with 4.2% R | Front Surface with 7% R | Conventional mirror with Front Surface 60% R, Rear Surface 45% R |
|---|---|---|---|
| | Percent | Percent | Percent |
| Fig. 2 | (b) 83 | (b) 74.5 | 59 |
| Fig. 3 | (c) 4 | (c) 5.3 | 6 |
| Fig. 4 | (d) 0.5 | (d) 1.1 | 2.5 |

In accordance with the broadest aspect of this invention wherein it is not necessarily essential that the three positions produce successive bright, medium and dim images, the direct or primary reflection on the front surface producing the image $a$ can be utilized. In this particular modification, the image $a$, having an intensity of 4.2% with a 4.2% reflective front surface and 7.2% with a 7.2% reflective front surface, is substituted for the image $c$ so that the dim and medium images are located on each side of the bright image $b$. It should be understood, however, that the preferred arrangement is the use of images $b$, $c$ and $d$ in that particular succession to produce successive bright, medium, and dim images. This arrangement eliminates bringing a high intense image within the driver's field of vision when adjusting the mirror from medium to dim or dim to medium.

*Operation*

The operation of this mirror unit should become obvious from the above description. Having mounted the unit in the car or on the motor vehicle, the knob 24 is set in the bright position of FIG. 2. Then the entire unit is adjusted to give full view through the rear window of the vehicle. When driving during the day it is usually preferable to set the mirror at the bright position of FIG. 2. On extremely bright days it might be desirable to switch it to the second position of FIG. 3 in which position the image $c$ is brought into view of the driver. It is obvious that all drivers will not necessarily select the same image intensity for driving on a similar road and lighting conditions, since each will select an image intensity that best suits his particular eyes under the existing condition. Thus, while the brightest image might generally be used by most drivers during day driving, some drivers might use the medium setting of FIG. 3. This gives an intensity of 4% with a 4.2% front surface. While driving at night most drivers would usually use the third range of image intensity as illustrated by FIG. 4. However, the setting of FIG. 3 could also be used at night. In any event, the normal eye can readily distinguish the difference in the intensities of images $c$ and $d$ which heretofore has been very difficult to obtain. This distinction is obvious from the differences in intensities set forth in the table above. The 4% intensity of image $c$ is eight times greater than the intensity 0.5% of the $d$ image and since any unit of intensity is distinguishable only if it is approximately 10 times as great, it should be clear that two images are more distinct than the images of the conventional mirror. It is obvious from this example that this mirror produces a sharper reduction of reflectivity in being adjusted from the medium to the dim positions.

Coatings of 3–10% are very inexpensive and as a result the cost of this mirror is substantially less than mirrors requiring expensive coating such as the conventional mirror referred to.

Having described our invention it should become obvious that although we have described preferred embodiments, alterations and modifications are possible within the broadest aspect of this invention. Therefore, this invention should be limited only as set forth by the express language of the pending claim.

We claim:

A multiple position rear view mirror unit for motor vehicles for producing three images of progressively distinguishable high, medium, and low intensities, said images being successively brought into view of the driver in the above order by tilting the mirror of the unit from a first, to a second, to a third position, said mirror comprising: a rigid support means for mounting said unit on said motor vehicle; a mirror frame; adjustable support means for selectively supporting said mirror frame on said rigid support means in said first, second, and third positions; actuating means for moving said mirror to each of said selective positions; a mirror mounted on said frame and having a front surface of 3–10% reflectivity and a rear surface of 60% to near 100% reflectivity; said surfaces being arranged at an angle to each other and spaced one from the other a proper distance to cause the reflections from a given direction from said rear surface to cross each other at points located between the driver and the mirror unit to bring into view of the driver a bright primary reflection produced by an image reflected directly to the driver from the rear surface while said frame is in said first position, a medium intense secondary reflection produced by an image reflected from the rear surface to the front surface, reflected back to the rear surface from the inside front surface, and then again reflected from said rear surface through the front surface to the driver while said frame is in said second position, and a dim tertiary reflection produced by an image reflected from the rear surface to the front surface, reflected back to the rear surface from the inside front surface, reflected back to the inside front surface and then back to the rear surface, and then again reflected from said rear surface through the front surface to the driver while said frame is in said third position.

References Cited in the file of this patent

UNITED STATES PATENTS

| | | |
|---|---|---|
| 1,909,526 | Falge et al. | May 16, 1933 |
| 1,919,475 | McKinley | July 25, 1933 |
| 2,839,964 | Ponce | June 24, 1958 |
| 2,843,017 | Ponce | July 15, 1958 |
| 2,882,793 | Petri et al. | Apr. 21, 1959 |

FOREIGN PATENTS

| | | |
|---|---|---|
| 839,129 | France | Dec. 26, 1938 |
| 1,117,799 | France | Mar. 5, 1956 |
| 1,123,827 | France | June 18, 1956 |